No. 807,415. PATENTED DEC. 12, 1905.
C. G. BRINK.
ROPE CLUTCH FOR FODDER BINDERS.
APPLICATION FILED MAY 4, 1905.
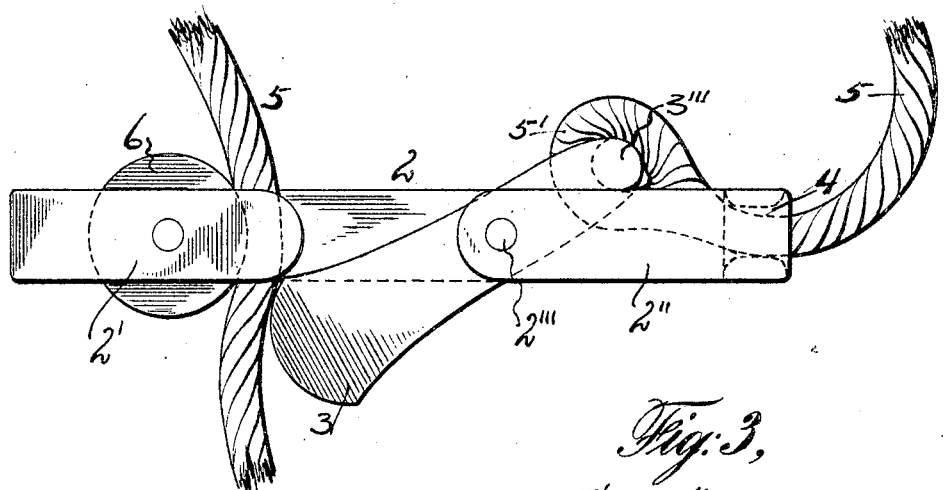
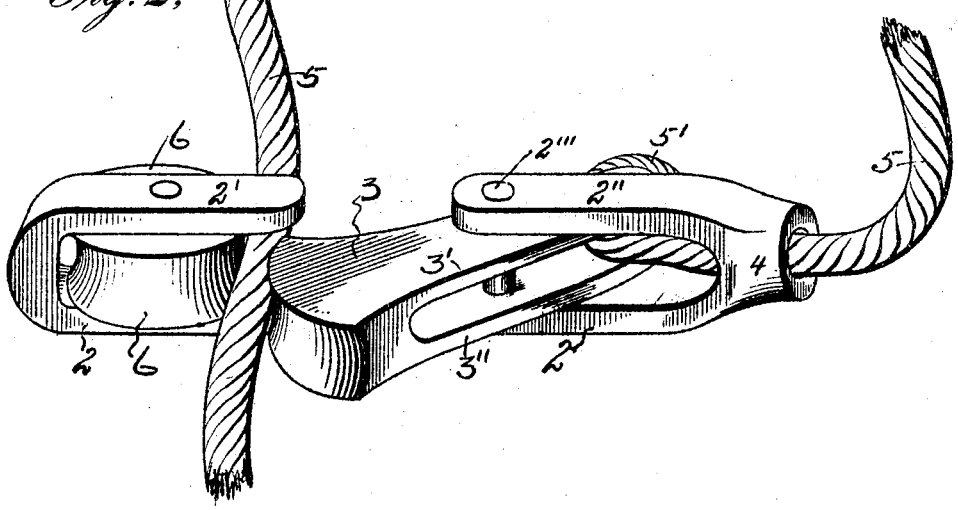
Witnesses
Max B. A. Doring
F. B. Wright
Clifford G. Brink, Inventor
By his Attorneys Hensey & Gough

UNITED STATES PATENT OFFICE.

CLIFFORD G. BRINK, OF NASHUA, IOWA.

ROPE-CLUTCH FOR FODDER-BINDERS.

No. 807,415.      Specification of Letters Patent.      Patented Dec. 12, 1905.

Application filed May 4, 1905. Serial No. 258,880.

*To all whom it may concern:*

Be it known that I, CLIFFORD G. BRINK, a citizen of the United States, residing at Nashua, in the county of Chickasaw, State of Iowa, have invented certain new and useful Improvements in Rope-Clutches for Fodder-Binders, of which the following is a specification.

The objects of the invention are to provide a fodder-binder rope-clutch which is simple in construction and positive in its operation, which may be cheaply and strongly made, which may be used with the rope on either hand thereof, which shall have no projecting portions liable to catch in loose stalks or trash, and one in which the binding-rope exerts a constant pull on the dog to make it bind upon the rope.

To these ends my invention consists in the details of construction to be hereinafter described, and set forth more particularly in the claims.

In the drawings, Figure 1 is an upper face view of the rope-clutch. Fig. 2 is a perspective. Fig. 3 is a section of the rear end of the dog and frame to show more clearly the construction of the pillar.

Similar reference-numerals designate like parts.

2 designates a frame, made, preferably, of metal, whose ends 2' 2'' are turned back upon itself, as shown clearly in Fig. 2. A space is left between the adjacent ends of the turned-back portions, the space being at least great enough for the insertion of the rope 5 sidewise into the clutch without the necessity of threading it into the device. Though this is preferable for many reasons, yet the two turned-back ends 2' 2'' might be joined to form a continuous side plate, if desired.

In one end of the frame between its main portion and the turned-back portion 2' is pivoted a pulley 6, having a concaved face. Near the middle of the frame and between it and the end of the turned-back portion 2'' is pivoted a gripping-dog 3. This is preferably of a sector-shape at its head or biting end. At its rear end the dog 3 is continued beyond the pivot 2''' and is connected to the rope 5 of the binder. While this connection may be made in any suitable manner which will permit of a free movement of the rope, I prefer that the dog be formed of two side plates 3' 3'', somewhat tapering in plan, connected at the head and rear ends by connecting-webs. The rear ends of the side plates are connected by a pillar 3''', rounded in plan and concaved as to face, so as to fit the loop 5' of rope 5. I deem it best that the dog, with its head, side plates, and pillar, be cast in one piece, but this is not material.

At what may be termed its "rear" end the frame is prolonged slightly into a tubular passage or eye 4, whose forward and rear interior corners are rounded off, as shown in dotted lines in Fig. 1. The binding-rope 5 has a loop 5' at one end, which passes freely around the pillar 3'''. In order to prevent wear, the loop might be provided with the ordinary thimble used for rope-loops, but this is not necessary, as the rounded face of the pillar allows the loop to turn easily and without great friction.

It is to be noted that the rope 5 passes from the pillar 3''' through the passage 4 and does not pass from the dog directly around the shock or bundle, or, in other words, that axially with the frame of the device and on a median line between the two extremes of movement of the dog the frame is provided with a bearing against which the binding-rope takes, no matter in which position the dog is set. In all other rope-clutches for fodder-binders known to me the rope passes directly from the end of the dog around the shock.

The dog is so placed relative to the pulley 6 that when the dog is brought inward axially to the frame there will not be space enough between the concaved sector-shaped head of the dog and the pulley to allow the passage of the rope. By turning the head of the dog out, however, the rope may be slipped between the turned-over portions 2' 2'' of the frame and against the face of the pulley. In operation the device is held in one hand and the rope 5 passed about the shock and into the space between the dog-head and the pulley 6. A pull on this rope to tighten it about the shock tends through the instrumentality of the eye 4 to force the head of the dog against the rope and to bite it between the dog and pulley. The passage of the rope as it moves outward, however, against the face of the sector-shaped or cam-like head forces the dog outward, so that the rope may slip by easily. The moment, however, that the pull on the rope is relieved the shock tends to expand and the rope slacks or moves reversely through the clutch. The reverse motion of the rope by its contact with the head acts to move the head inward to a middle position, and the rope is thus jammed between the jaw and the pulley. It is to be noted that the pull on the rope 5 rearward of the heel of the dog being always in a direction to close the dog into line with the frame the head is always being forced into frictional engagement with the rope, so that it is immediately acted upon by the reverse movement of the rope between the pulley and the head. Thus the gripping action of the dog is entirely automatic, and the dog does not require to be forced into action by the hand of the operator. This is an important point when it is taken into consideration that at the time the rope is being tightened around the shock both hands of the operator are gripping the rope and his body is braced to exert a pull. Without some means for holding the head of the dog into engagement with the rope the pull on the rope would turn the dog on its pivot so far outward that it would be out of engagement with the rope entirely, and this means must be capable of operating without regard to which side the rope passes out.

The operation of the device will be apparent to all users of this class of devices. The rope is passed around the bundle and then passed between dog and pulley. It is then pulled taut. At each "slack," when the operator releases the rope to get a new hold, the dog grips the rope and holds the bundle bound. When at last the shock is compressed to its limit, a binding twine or wire is passed around it and fastened. The operator then presses with his thumb on the end of the dog, which releases the rope, which may then be removed through the side opening.

While I have particularly devised my improved rope-clutch for use in binding fodder, it may, of course, be used in bundling any other material. While I have shown a revoluble pulley 6, I wish it understood that I might use a fixed block, against which the rope bears. Preferably, however, every part should be calculated to reduce friction on the rope, and it is to this end that I provide the eye 4 with rounded corners, so that there may be no angular bind on the rope as it passes through it.

Having described my invention, what I claim is—

1. A rope-clutch for fodder-binders, comprising a frame, a pulley mounted on the frame, and a dog pivoted to the frame coöperating with the pulley to grip a binder-rope and adapted to be connected to the binder-rope, the said frame being provided with an eye for the passage of the binder-rope, rearwardly of the dog.

2. A rope-clutch for fodder-binders, comprising a frame, a pulley mounted on the frame, a dog pivoted to the frame and coöperating with the pulley to grip a binder-rope, the said dog being extended rearwardly beyond its pivot for attachment to the end of the binder-rope, and the frame being provided with an eye for the passage of said rope, the eye being located rearward of the dog and in line with the pivot of the dog.

3. A rope-clutch for fodder-binders, comprising a frame, a pulley mounted at one end of the frame, a dog pivoted to the frame and coöperating with the pulley to grip a binder-rope and having an extension beyond said pivot for attachment to the end of the binder-rope, and an eye on the frame rearward of the dog and in line with the pivot thereof, said eye having a passage therethrough whose ends are rounded for the passage of the rope.

4. A rope-clutch for fodder-binders, comprising a longitudinal frame formed with upper and lower separated side portions, a pulley mounted at one end of the frame and between the said side portions, a dog having a rearward extension pivoted at its middle between the sides of the frame and coöperating with the pulley to grip a binder-rope, means on the end of the dog extension by which to attach the end of the binder-rope, and a tubular extension at the end of the frame forming an eye for the passage of said rope, the walls of the tubular extension being rounded at their entrance and exit ends.

5. A rope-clutch for fodder-binders, comprising a longitudinal frame having re-turned ends forming one side of said frame, a pulley mounted between the frame and one re-turned end, a sector-shaped dog having a rearward extension pivoted at its middle between the other re-turned end and the frame, a pillar on the end of the extension for the attachment of a binder-rope, and a tubular extension on the frame in rear of the dog for the passage of the rope, the walls of said extension being rounded at their entrance and exit ends.

6. A rope-clutch for fodder-binders, comprising a longitudinal frame 2, having re-turned ends 2' 2'', a pulley 6, and a sector-shaped dog formed of the conjoined side pieces 3' 3'', and having the pillar 3''' at its end, the said end of said frame rearward of the dog having the tubular extension 4, the entrance and exit ends of said tubular extension being rounded outwardly.

In testimony whereof I have signed my name to this specification, in the presence of two subscribing witnesses, this 29th day of April, 1905.

CLIFFORD G. BRINK.

Witnesses:
W. F. GETSCH,
R. F. WENTWORTH.